(12) United States Patent
Yu et al.

(10) Patent No.: US 9,615,317 B2
(45) Date of Patent: Apr. 4, 2017

(54) METHOD, DEVICE, AND SYSTEM FOR PROCESSING CLOSED SUBSCRIBER GROUP SUBSCRIPTION DATA REQUEST

(71) Applicant: Huawei Technologies Co., Ltd., Shenzhen (CN)

(72) Inventors: Youyang Yu, Shanghai (CN); Yanping Zhang, Shanghai (CN); Fenqin Zhu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/285,365

(22) Filed: May 22, 2014

(65) Prior Publication Data
US 2014/0274045 A1    Sep. 18, 2014

Related U.S. Application Data

(63) Continuation of application No. PCT/CN2011/082835, filed on Nov. 24, 2011.

(51) Int. Cl.
*H04W 4/00* (2009.01)
*H04W 48/16* (2009.01)
*H04W 8/18* (2009.01)

(52) U.S. Cl.
CPC ......... *H04W 48/16* (2013.01); *H04W 8/186* (2013.01)

(58) Field of Classification Search
None
See application file for complete search history.

(56) References Cited

U.S. PATENT DOCUMENTS 9,019,887 B2 * 4/2015 Lim .................. H04W 4/08
                                                      370/313
2012/0033679 A1 * 2/2012 Horn .................... 370/401

FOREIGN PATENT DOCUMENTS

| CN | 101557562 | 10/2009 |
| CN | 102045895 | 5/2011 |
| WO | 2010075470 | 7/2010 |

OTHER PUBLICATIONS

3rd Generation Partnership Project, "Technical Specification Group Services and System Aspects; General Packet Radio Service (GPRS) enhancements for Evolved Universal Terrestrial Radio Access Network (E-UTRAN) access," 3GPP TS 23.401, Version 10.5.0, Release 10, Sep. 2011, 282 pages.

(Continued)

*Primary Examiner* — German J. Viana Di Prisco
(74) *Attorney, Agent, or Firm* — Slater Matsil, LLP

(57) ABSTRACT

The present invention relates to a method, a device, and a system for processing a request for closed subscriber group subscription data. A closed subscriber group subscriber server receives a request sent by a mobility management network element. The request includes an identifier of the mobility management network element and an identifier of a user equipment is used for requesting closed subscriber group subscription data of the user equipment. If the closed subscriber group subscription data of the user equipment does not exist, the closed subscriber group subscriber server stores the identifier of the mobility management network element and the identifier of the user equipment.

15 Claims, 6 Drawing Sheets

(56) References Cited

OTHER PUBLICATIONS

3rd Generation Partnership Project, "Technical Specification Group Core Network and Terminals; Mobile Application Part (MAP) specification," 3GPP TS 29.002, Version 11.0.0, Release 11, Sep. 2011, 953 pages.

3rd Generation Partnership Project, "Technical Specification Group Core Network and Terminals; Evolved Packet System (EPS); Mobility Management Entity (MME) and Serving GPRS Support Node (SGSN) related interfaces based on Diameter protocol," 3GPP TS 29.272, Version 11.0.0, Release 11, Sep. 2011, 97 pages.

International Search Report received in Application No. PCT/CN2011/082835, mailed Aug. 30, 2012, 2 pages.

Alcatel-Lucent, 3GPP TSG CT WG4 Meeting #54bis, C4-112822, Change Request, Current version 11.0.0, "VCSG procedures over S7a/S7d," Oct. 10-14, 2011, 6 pages.

Alcatel-Lucent, 3GPP TSG CT WG4 Meeting #54bis, C4-112504, "VSCG offline discussion," Oct. 10-14, 2011, 4 pages.

Alcatel-Lucent, 3GPP TSG SA WG2 Meeting #84, TD S2-111401, "Support for the VPLNM to store and manage CSG subscription information for roaming UEs," Apr. 11-15, 2011, 6 pages.

Qualcomm Incorporated et al., SA WG2 Meeting #86, S2-113190, Change Request, Current version 10.4.0, "Retrieval of VPLMN CSG subscription information during MM procedures," Jul. 11-15, 2011, 36 pages.

Qualcomm Incorporated et al., SA WG2 Meeting #88, S2-114975, revision of S2-113553, Change Request, Current Version 10.5.0, "Retrieving CSG subscription information from CCS," Nov. 14-18, 2011, 38 pages.

Extended European Search Report received in Application No. 11876192.3-1864, mailed Oct. 29, 2014, 14 pages.

LTE, "3rd Generation Partnership Project; Technical Specification Group Core Network and Terminals; Numbering, Addressing and Identification (Release 10)," 3GPP TS 23.003 v10.3.0, Sep. 2011, 80 pages.

LTE, "3rd Generation Partnership Project; Technical Specification Group Core Network and Terminals; Organization of Subscriber Data (Release 11)," 3GPP TS 23.008 v11.1.0, Sep. 2011, 104 pages.

LTE, "3rd Generation Partnership Project; Technical Specification Group Services and System Aspects; General Packet Radio Service (GPRS); Service Description; Stage 2 (Release 10)," 3GPP TS 23.060 v10.5.0, Sep. 2011, 321 pages.

Calhoun, P., et al., "Diameter Base Protocol," Network Working Group, Request for Comments: 3588; Category: Standards Track, Sep. 2003, 147 pages.

* cited by examiner

METHOD, DEVICE, AND SYSTEM FOR PROCESSING CLOSED SUBSCRIBER GROUP SUBSCRIPTION DATA REQUEST

This application is a continuation of International Application No. PCT/CN2011/082835, filed on Nov. 24, 2011, which is hereby incorporated by reference in its entirety.

TECHNICAL FIELD

The present invention relates to the technical file of communications, and in particular, to a method, a device, and a system for processing a request for closed subscriber group subscription data.

BACKGROUND

With the development of communications technologies, a 3rd Generation Partnership Project (3GPP) standards organization and a non-3GPP standards organization propose home access technologies. A user equipment (UE) may be connected to an operator network through an Internet Protocol (IP) network by using a permissive frequency band through a home wireless access point.

In order to restrict the UE to access a specific home wireless access point or a wireless access point, a closed subscriber group (CSG) mechanism is introduced. One CSG area includes one or more cells, and is identified by using one CSG identifier (ID). A closed subscriber group subscriber server (Closed Subscriber Group Subscriber Server, CSS) is configured to manage CSG subscription data of the user equipment. The CSS stores a list of CSGs which the user equipment is allowed to access, where the list is referred to as a CSG white list, and the CSG white list includes one or more CSG IDs.

In a roaming scenario, to implement autonomy of CSG subscription data in a visited domain network, a CSS of the visited domain network is deployed in the visited domain network. A mobility management network element in the visited domain network acquires the CSG subscription data of the visited domain network of the user equipment by accessing the local CSS deployed in the visited domain network, so as to perform access control on the UE in accessing the CSG area of the visited domain network. After the CSG subscription data of the visited domain network of the user equipment is changed, the operator of the visited domain may update the CSG subscription data of the visited domain network of the user equipment directly by modifying the CSG subscription data of the visited domain network that is stored in the CSS deployed in the visited domain network, without the need of notifying an operator of a home domain network.

In the prior art, when the user equipment roams in the visited domain network, the mobility management network element of the visited domain network probably may not be able to acquire the updated CSG subscription data of the visited domain network of the user equipment, resulting in that the user equipment cannot access a CSG area, which the user equipment is allowed to access, of the visited domain network.

SUMMARY OF THE INVENTION

Embodiments of the present invention provide a method, a device, and a system for processing a request for closed subscriber group subscription data, so as to avoid that a mobility management network element in a visited domain network cannot acquire updated CSG subscription data of the visited domain network.

In one aspect, an embodiment of the present invention provides a method for processing a request for closed subscriber group subscription data, including: receiving, by a closed subscriber group subscriber server, a request for closed subscriber group subscription data sent by a mobility management network element, where the request for closed subscriber group subscription data includes an identifier of the mobility management network element and an identifier of a user equipment, and is used for requesting closed subscriber group subscription data of the user equipment; and if the closed subscriber group subscription data of the user equipment does not exist, storing, by the closed subscriber group subscriber server, the identifier of the mobility management network element and the identifier of the user equipment.

In another aspect, an embodiment of the present invention provides a method for requesting closed subscriber group subscription data, including: when a mobility management network element does not have the closed subscriber group subscription data of a user equipment, determining, by the mobility management network element, that the mobility management network element does not have a registration success indication of a closed subscriber group subscriber server of the user equipment, where the registration success indication of the closed subscriber group subscriber server is used for indicating that the closed subscriber group subscriber server stores an identifier of the mobility management network element; sending, by the mobility management network element, a request for closed subscriber group subscription data to the closed subscriber group subscriber server, where the request for closed subscriber group subscription data includes the identifier of the mobility management network element and an identifier of the user equipment, and is used for requesting closed subscriber group subscription data of the user equipment.

In still another aspect, an embodiment of the present invention provides a method for deleting closed subscriber group subscription data, including: receiving, by a closed subscriber group subscriber server, a request for deleting closed subscriber group subscription data sent by a mobility management network element, where the request for deleting closed subscriber group subscription data includes an identifier of a user equipment; and if the closed subscriber group subscription data of the user equipment does not exist, deleting, by the closed subscriber group subscriber server, an identifier of the mobility management network element and the identifier of the user equipment that are already stored.

In yet another aspect, an embodiment of the present invention provides a closed subscriber group subscriber server, including: a receiving unit, configured to receive a request for closed subscriber group subscription data sent by a mobility management network element, where the request for closed subscriber group subscription data includes an identifier of the mobility management network element and an identifier of a user equipment, and is used for requesting closed subscriber group subscription data of the user equipment; and a storage unit, configured to, when closed subscriber group subscription data of the user equipment does not exist, store the identifier of the mobility management network element and the identifier of the user equipment.

In yet another aspect, an embodiment of the present invention provides a mobility management network element, including: a first judging unit, configured to, when the mobility management network element does not have the closed subscriber group subscription data of a user equipment, determine whether the mobility management network element has a registration success indication of a closed subscriber group subscriber server of the user equipment, where the registration success indication of the closed subscriber group subscriber server is used for indicating that the closed subscriber group subscriber server stores an identifier of the mobility management network element; a sending unit, configured to, when the first judging unit determines that the mobility management network element does not have the registration success indication of the closed subscriber group subscriber server of the user equipment, send a request for closed subscriber group subscription data to the closed subscriber group subscriber server, where the request for closed subscriber group subscription data includes the identifier of the mobility management network element and an identifier of the user equipment, and is used for requesting closed subscriber group subscription data of the user equipment.

In yet another aspect, an embodiment of the present invention provides a system for processing a request for closed subscriber group subscription data, including a mobility management network element and a closed subscriber group subscriber server. The mobility management network element is configured to, when the mobility management network element does not have the closed subscriber group subscription data of a user equipment, determine that the mobility management network element does not have a registration success indication of a closed subscriber group subscriber server of the user equipment; and send a request for closed subscriber group subscription data to the closed subscriber group subscriber server, where the request for closed subscriber group subscription data includes an identifier of the mobility management network element and an identifier of the user equipment, and is used for requesting closed subscriber group subscription data of the user equipment. The closed subscriber group subscriber server is configured to receive the request for closed subscriber group subscription data sent by the mobility management network element; and if closed subscriber group subscription data of the user equipment does not exist, store the identifier of the mobility management network element and the identifier of the user equipment.

According to the technical solutions provided by the embodiments of the present invention, in one aspect, in the case that the closed subscriber group subscription data of the user equipment does not exist, the closed subscriber group subscriber server stores the identifier of the mobility management network element, and when the closed subscriber group subscription data of the user equipment is changed, the closed subscriber group subscriber server may initiate a subscription data insertion flow according to the stored identifier of the mobility management network element to synchronize the updated closed subscriber group subscription data to the mobility management network element. In another aspect, when the mobility management network element does not have the closed subscriber group subscription data of the user equipment and the closed subscriber group subscriber server does not store the identifier of the mobility management network element, the mobility management network element actively sends the request for closed subscriber group subscription data to the closed subscriber group subscriber server to obtain the closed subscriber group subscription data of the user equipment. Therefore, through the technical solutions provided by the embodiments of the present invention, the mobility management network element can obtain the updated closed subscriber group subscription data of the user equipment, thereby solving the problem that the user equipment cannot access a closed subscriber group area, which the user equipment is allowed to access, of a visited domain network because the mobility management network element cannot acquire the updated closed subscriber group subscription data of the user equipment.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF ILLUSTRATIVE EMBODIMENTS

Figure 1:
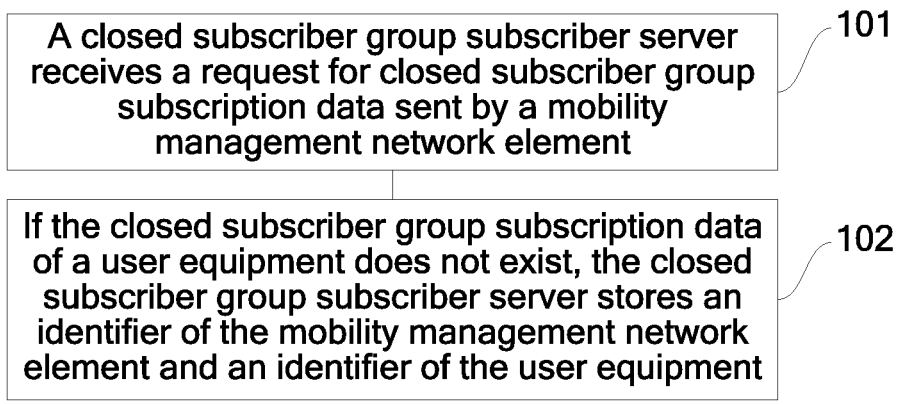
FIG. 1 is a schematic flow chart of a method for processing a request for closed subscriber group subscription data according to an embodiment of the present invention.

The technical solutions of the present invention may be clearly and comprehensively described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

The technical solutions provided by embodiments of the present invention may be applied to various wireless communication networks, such as code division multiple access (CDMA), time division multiple access (TDMA), frequency division multiple access (FDMA), orthogonal frequency-division multiple access (OFDMA), single carrier FDMA (SC-FDMA) and other networks. The terms "network" and "system" may replace each other. The CDMA network may implement wireless technologies such as universal terrestrial radio access (UTRA) and CDMA2000. The UTRA may include CDMA, WCDMA, and other variations of the CDMA. CDMA2000 may cover interim standard (IS) 2000 (IS-2000), IS-95, and IS-856 standards. The TDMA network may implement wireless technologies such as global system for mobile communication (Global System for Mobile Communication, GSM). The OFDMA network may implement wireless technologies such as evolved UTRA (E-UTRA), ultra mobile broadband (UMB), IEEE 802.11 (Wi-Fi), IEEE 802.16 (WiMAX), IEEE 802.20, or Flash OFDMA. UTRA and E-UTRA are UMTS and an evolved version of UMTS. 3GPP uses the new version of UMTS of E-UTRA in Long Term Evolution (LTE) and LTE Advanced (LTE Advanced, LTE-A). The UTRA, E-UTRA, UMTS, LTE, LTE-A, and GSM are recorded and described in files of the 3GPP standards organization. The CDMA2000 and UMB are recorded and described in files of the 3GPP2 standards organization. The technologies described in the embodiments of the present invention may also be applied in the wireless networks and the wireless technologies.

In the embodiments of the present invention, a base station (Base Station, BS) may be a station in communication with a user equipment (User Equipment, UE) or another communication station such as a relay station, and may provide communication coverage in a specific physical area. The base station is a femto cell (femto cell), and the cell provides communication coverage. The femto cell covers a relatively small geographic area such as a home, and allows a UE associated with the femto cell to access restrictively. The base station servicing the femto cell may be referred to as a femto base station or a home base station. The base station may support one or more cells.

In the embodiments of the present invention, the UEs may be distributed in the whole wireless network, and each UE may be static or mobile. The UE may be referred to as a terminal (terminal) or a mobile station (mobile station). The UE may be a personal digital assistant (Personal Digital Assistant, PDA), a wireless communication device, or a laptop computer (laptop computer). The UE may be in communication with the femto base station.

In the embodiments of the present invention, a mobility management network element is used for mobility management on a control plane. The mobility management network element may be a mobility management entity (Mobility Management Entity, MME) or serving GPRS supporting node (Serving GPRS Supporting Node, SGSN). The MME is configured to implement control-plane mobility management in the E-UTRA network, including user context management and mobile state management, and allocation of user temporary identities. The SGSN is configured to implement functions such as route forwarding, mobility management, session management, and user information storage in the GPRS/UMTS network.

In the embodiments of the present invention, a closed subscriber group subscriber server (Closed Subscriber Group Subscriber Server, CSS) is configured to manage closed subscriber group subscription data of a user equipment.

As shown in FIG. 1, an embodiment of the present invention provides a method for processing a request for closed subscriber group subscription data, which includes the following steps.

101: A closed subscriber group subscriber server receives a request for closed subscriber group subscription data sent by a mobility management network element.

The request for closed subscriber group subscription data includes an identifier of the mobility management network element and an identifier of a user equipment, and is used for requesting closed subscriber group subscription data of the user equipment. The identifier of the mobility management network element is an identifier of the mobility management network to which the user equipment is attached in a visited domain network. The identifier of the user equipment is an identifier capable of uniquely identifying the user equipment, and may be, for example, an international mobile subscriber identity (International Mobile Subscriber Identity, IMSI) or another identifier capable of uniquely identifying the user equipment.

102: If the closed subscriber group subscription data of the user equipment does not exist, the closed subscriber group subscriber server stores the identifier of the mobility management network element and the identifier of the user equipment.

The closed subscriber group subscriber server may store the identifier of the mobility management network element and the identifier of the user equipment by generating temporary context information of the user equipment, and may also directly store correspondence between the identifier of the mobility management network element and the identifier of the user equipment.

In the prior art, in one aspect, after the mobility management network element acquires the subscription data of the user equipment when the user equipment is attached, the mobility management network element does not actively initiate a CSG location update flow to the CSS to acquire the CSG subscription data of the user equipment; in another aspect, if the CSS does not store the identifier of the mobility management network element to which the user equipment is attached, then, after the CSG subscription data of the user equipment is changed, the CSS does not initiate a subscription data insertion flow to synchronize the updated CSG subscription data to the mobility management network element. In a roaming scenario, when the user equipment accesses from a macro-cell, a mobility management network element in a visited domain network acquires the subscription data of the user equipment from a home subscriber server (Home Subscriber Server, HSS) in a home domain network, and acquires CSG subscription data of the visited domain network of the user equipment from a CSS in the visited domain. Because the CSS does not have the CSG subscription data of the visited domain network of the user equipment, the CSS does not store an identifier of the mobility management network element, where the mobility management network element stores the subscription data of the user equipment acquired from the HSS and does not have the CSG subscription data of the visited domain network. When the CSG subscription data of the visited domain network of the user equipment is changed subsequently, in one aspect, because the mobility management network element stores the subscription data of the user equipment acquired from the HSS, the mobility management network element does not actively acquire the updated CSG subscription data of the visited domain network of the user equipment; in another aspect, because the CSS does not store the identifier of the mobility management network element, the CSS does not initiate a subscription data insertion flow to synchronize the updated CSG subscription data in the visited domain network to the mobility management network element. Therefore, the mobility management network element cannot acquire the updated CSG subscription data of the visited domain network of the user equipment, resulting in that the user equipment cannot access a CSG area, which the user equipment is allowed to access, of the visited domain network.

Compared with the prior art, in the method shown in FIG. 1, when the closed subscriber group subscription data of the user equipment does not exist, the identifier of the mobility management network element and the identifier of the user equipment are stored in the closed subscriber group subscriber server, and when the closed subscriber group subscription data of the user equipment is changed, the closed subscriber group subscriber server may initiate a subscription data insertion flow to synchronize the updated closed subscriber group subscription data to the mobility management network element, so that the mobility management network element can acquire the updated closed subscriber group subscription data of the user equipment, thereby solving the problem that the user equipment cannot access a closed subscriber group area, which the user equipment is allowed to access, of a visited domain network because the mobility management network element cannot acquire the updated closed subscriber group subscription data of the user equipment.

Figure 2:
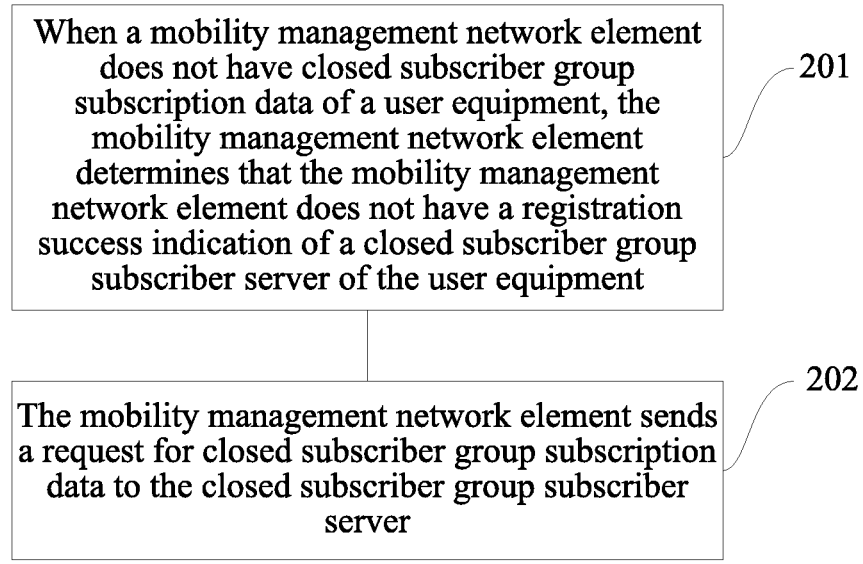
FIG. 2 is a schematic flow chart of a method for requesting closed subscriber group subscription data according to an embodiment of the present invention.

As shown in FIG. 2, an embodiment of the present invention further provides a method for requesting closed subscriber group subscription data, which includes the following steps.

201: When a mobility management network element does not have closed subscriber group subscription data of a user equipment, the mobility management network element determines that the mobility management network element does not have a registration success indication of a closed subscriber group subscriber server of the user equipment.

The registration success indication of the closed subscriber group subscriber server is used for indicating that the closed subscriber group subscriber server stores an identifier of the mobility management network element.

For example, the registration success indication of the closed subscriber group may be identification information, for indicating that the closed subscriber group subscriber server has already stored an identifier of the mobility management network element to which the user equipment is attached.

202: The mobility management network element sends a request for closed subscriber group subscription data to the closed subscriber group subscriber server.

The request for closed subscriber group subscription data includes an identifier of the mobility management network element and an identifier of the user equipment, and is used for requesting the closed subscriber group subscription data of the user equipment.

In the method shown in FIG. 2, when the mobility management network element does not have the closed subscriber group subscription data of the user equipment and the closed subscriber group subscriber server does not store the identifier of the mobility management network element, the mobility management network element actively sends the request for closed subscriber group subscription data to the closed subscriber group subscriber server to obtain the closed subscriber group subscription data of the user equipment, so that the mobility management network element can acquire the updated closed subscriber group subscription data of the user equipment, thereby solving the problem that the user equipment cannot access a closed subscriber group area, which the user equipment is allowed to access, of a visited domain network because the mobility management network element does not acquire the updated closed subscriber group subscription data of the user equipment.

Figure 3:
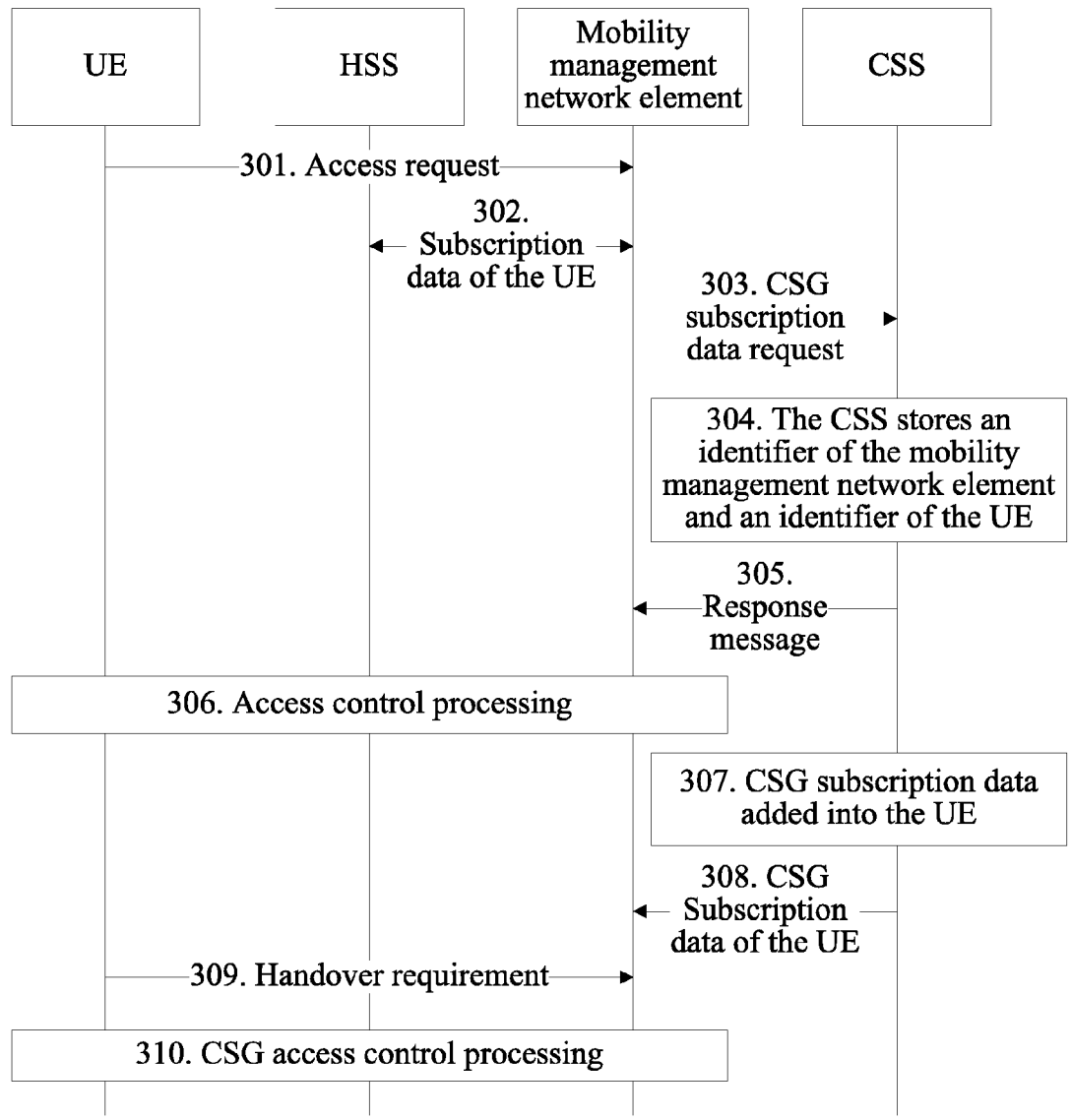
FIG. 3 is a schematic flow chart of another method for processing a request for closed subscriber group subscription data according to an embodiment of the present invention.

An embodiment of the present invention further provides a method for processing a request for closed subscriber group subscription data. If a UE is attached to a cell in a visited domain network, at this time, a mobility management network element in the visited domain network does not have subscription data of the UE, and a CSS in the visited domain network also does not have CSG subscription data of the UE. As shown in FIG. 3, the following are included.

301: The UE sends an access request to the mobility management network element.

The UE sends the access request to the mobility management network element to request access to a macro-cell of the visited domain network.

302: The mobility management network element interacts with an HSS to acquire subscription data of the UE.

303: The mobility management network element sends a CSG subscription data request to a CSS.

The CSG subscription data request includes an identifier of the mobility management network element and an identifier of the user equipment, and is used for requesting the CSG subscription data of the user equipment. For example, the CSG subscription data request may be a CSG location update message. For example, the identifier of the user equipment may be an IMSI or a mobile station international integrated services digital network number (Mobile Station International Integrated Services Digital Network Number, MSISDN).

304: The CSS stores the identifier of the mobility management network element and the identifier of the UE.

For example, the CSS may generate temporary context information of the UE and store the information, which includes the identifier of the mobility management network element and the identifier of the UE.

In this way, by storing, in the CSS, the identifier of the mobility management network element and the identifier of the UE, when the CSG subscription data of the UE is changed, the CSS may initiate a subscription data insertion flow to synchronize the updated CSG subscription data to the mobility management network element.

305: The CSS sends a response message to the mobility management network element.

The response message sent by the CSS to the mobility management network element may carry an indication cell, for indicating that the CSG subscription data of the UE does not exist. For example, a No CSG Data cell may be carried in the response message to indicate that the CSG subscription data of the UE does not exist.

306: The mobility management network element performs access control processing.

It is assumed that the CSG subscription data of the visited domain network of the UE is updated subsequently.

307: Add the CSG subscription data of the UE into the CSS.

The added CSG subscription data of the UE includes a list of CSGs, which the UE is allowed to access, of the visited domain network.

308: The CSS sends the CSG subscription data of the UE to the mobility management network element.

Because the CSS stores the identifier of the mobility management network element and the identifier of the UE, after the CSG subscription data of the UE is added to the CSS, the CSS initiates a subscription data insertion flow to synchronize the CSG subscription data of the UE, which is added to the CSS, to the mobility management network element.

Afterwards, the UE moves to a CSG cell in the visited domain network.

309: A source access network element sends a handover requirement message to the mobility management network element.

The handover requirement message carries indication information, for indicating that the accessed cell is the CSG cell. For example, the indication information may be a CSG ID of the accessed CSG cell.

310: The mobility management network element performs CSG access control processing.

After receiving the access request for the UE to accessing the CSG cell, the mobility management network element performs CSG access control processing on the UE according to the CSG subscription data of the UE that is obtained in step 308.

If in step 304, the CSS does not store the identifier of the mobility management network element and the identifier of the UE, and when the CSG subscription data of the UE is added into the CSS, the CSS cannot synchronize the added CSG subscription data of the UE to the mobility management network element. Subsequently, when the UE requests access to the CSG cell of the visited domain network, if an access mode of the CSG is a closed access mode, the mobility management network element refuses the UE from accessing the CSG cell of the visited domain network, incurring that the UE cannot access the CSG cell which the UE is allowed to access.

In the method shown in FIG. 3, when the closed subscriber group subscription data of the user equipment does not exist, the identifier of the mobility management network element is stored in the closed subscriber group subscriber server, and when the closed subscriber group subscription data of the user equipment is changed, the closed subscriber group subscriber server may initiate, according to the stored identifier of the mobility management network element, a subscription data insertion flow to synchronize the updated closed subscriber group subscription data to the mobility management network element, thereby solving the problem that the user equipment cannot access a closed subscriber group area, which the user equipment is allowed to access, of a visited domain network because the mobility management network element cannot acquire the updated closed subscriber group subscription data of the user equipment.

Figure 4:
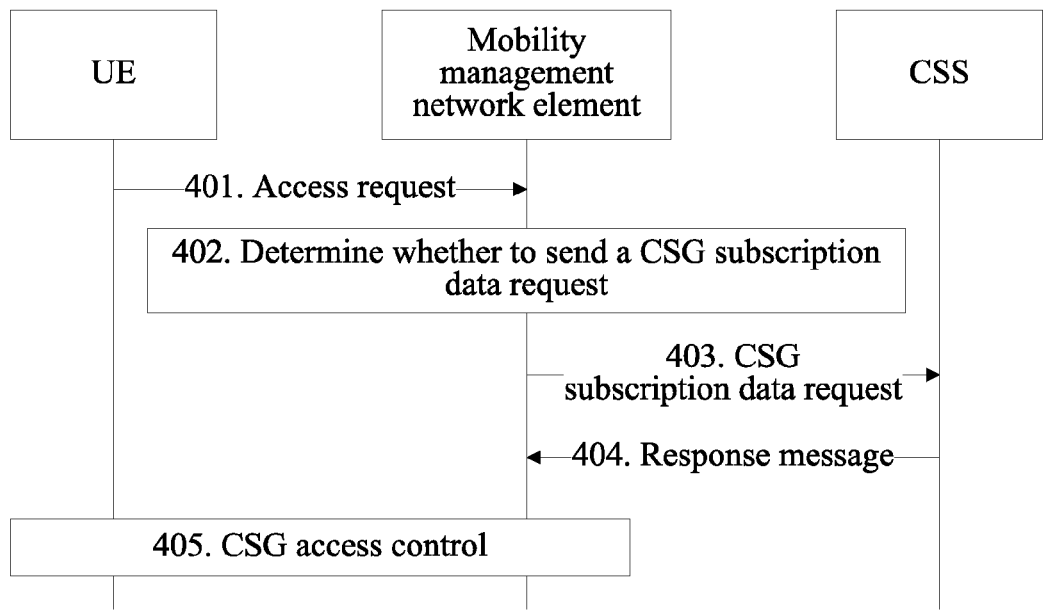
FIG. 4 is a schematic flow chart of another method for requesting closed subscriber group subscription data according to an embodiment of the present invention.

An embodiment of the present invention further provides a method for requesting closed subscriber group subscription data. The case that a user equipment accesses a CSG cell in a roaming scenario is taken as an example for description, and as shown in FIG. 4, the following are included.

401: The UE sends an access request message to a mobility management network element.

The UE sends the access request message to the mobility management network element through an access network cell, where the UE carries indication information in the access request, for indicating that the accessed cell is a CSG cell. For example, the indication information may be a CSG ID of the accessed CSG cell.

402: The mobility management network element determines whether to send a CSG subscription data request to a CSS.

When the mobility management network element does not have the CSG subscription data of the UE, the mobility management network element determines whether to send the CSG subscription data request to the CSS.

The following judgment conditions may be taken into consideration when determining whether to send the CSG subscription data request to the CSS.

Condition a: the mobility management network element does not have a CSS registration success indication of the user equipment.

If the mobility management network element has the CSS registration success indication of the user equipment, it indicates that the CSS has already stored the identifier of the mobility management network element. When the CSG subscription data of the UE is changed, the CSS synchronizes the updated CSG subscription data of the UE to the mobility management network element. Therefore, if the mobility management network element has the CSS registration success indication of the user equipment currently, even if the CSG subscription data of the UE does not exist, the mobility management network element does not need to request the CSG subscription data of the UE. When it is decided, by determining whether the mobility management network element has the CSS registration success indication of the user equipment, whether to send the CSG subscription data request, signaling interaction between the mobility management network element and the CSS can be effectively reduced, thereby alleviating the load of a network.

For example, the registration success indication of a closed subscriber group may be identification information, for indicating that the CSS has already stored the identifier of the mobility management network element. It should be noted that, the mobility management network element stores the CSG subscription data of the user equipment, so as to indicate that the CSS has already stored the identifier of the mobility management network element.

Condition b: the cell to which the UE requests access is the CSG cell.

When the cell to which the UE requests access is not the CSG cell, it does not need to acquire the CSG subscription data of the UE. Because most of UEs in the network access the mobility management network element through the macro-cell, when it is decided, by determining whether the cell to which the UE requests access is the CSG cell, whether to send the CSG subscription data request, signaling interaction between the mobility management network element and the CSS can be effectively reduced, thereby alleviating the load of the network.

Condition c: the UE subscribes to a CSG service.

It can be learned, according to the subscription data of the UE, whether the UE subscribes to the CSG service; if the UE does not subscribe to the CSG service, the CSG subscription data of the UE does not exist, so that the mobility management network element does not need to send the CSG subscription data request. Therefore, when it is decided, by determining whether the UE subscribes to the CSG service, whether to send the CSG subscription data request, rather than sending the CSG subscription data request to all UEs, signaling interaction between the mobility management network element and the CSS can be effectively reduced, thereby alleviating the load of the network.

When performing judgment, the mobility management network element may select the condition a, or a combination of the condition a and another judgment condition, so as to determine whether it is required to send the CSG subscription data request to the CSS. For example, when the condition a is met, or the condition a and the condition b are both met, or the condition a and the condition c are both met, or the condition a, the condition b and the condition c are all met, the mobility management network element needs to send the CSG subscription data request to the CSS.

It should be noted that, the foregoing judgment conditions are merely for exemplary purpose, and do not constitute restrictions to the technical solutions of the present invention. In the implementation, it may also be determined, according to configuration requirements of an operator and whether the CSS registration success indication of the user equipment exists, whether to send the CSG subscription data request to the CSS. For example, when the number of failures of the UE accessing the CSG exceeds a maximum limitation number and the mobility management network element does not have the CSS registration success indication of the user equipment, or the CSG of the cell the UE accesses is a special CSG and the mobility management network element does not have the CSS registration success indication of the user equipment, the mobility management network element needs to send the CSG subscription data request to the CSS.

In addition, in the prior art, when the CSS stores the CSG subscription data of the user equipment, after receiving the CSG subscription data request, the CSS stores the identifier of the mobility management network element. When the mobility management network element stores the CSG subscription data of the user equipment, it may be considered that the CSS has already stored the identifier of the mobility management network element. Therefore, when the CSG subscription data of the UE is updated, a closed subscriber group subscriber server synchronizes the latest CSG subscription data of the UE to the mobility management network element. If the mobility management network element has the CSG subscription data of the UE currently, the CSG subscription data is the latest CSG subscription data of the UE, and therefore, it does not need to acquire the CSG subscription data from the CSS.

For example, in the method, the judgment is performed under the condition a, that is, when the condition a is met, the mobility management network element determines that it needs to send the CSG subscription data request to the CSS.

If the mobility management network element determines that it needs to send the CSG subscription data request to the CSS, step 403 is performed; otherwise, the mobility management network element does not send the CSG subscription data request to the CSS.

403: The mobility management network element sends the CSG subscription data request to the CSS.

The CSG subscription data request includes an identifier of the mobility management network element and an identifier of the user equipment, and is used for requesting the CSG subscription data of the user equipment. For example, the CSG subscription data request may be a CSG location update message. For example, the identifier of the user equipment may be an IMSI or a mobile station international integrated services digital network number (Mobile Station International Integrated Services Digital Network Number, MSISDN).

Optionally, the CSG subscription data request further includes a CSS registration indication, for instructing the CSS to store the identifier of the mobility management network element and the identifier of the user equipment. For example, the CSG subscription data may include a Store Indication cell or Register Indication cell to indicate that the CSS registration indication is included; or the CSG subscription data request does not include a Not Store Indication cell to indicate that the CSS registration indication is included; or the CSG subscription data request includes a Store Flag cell, and when Store Flag=True, it indicates that the CSS registration indication is included. The CSG subscription data request includes the CSS registration indication to instruct the CSS to store the identifier of the mobility management network element and the identifier of the user equipment, so that when the CSG subscription data of the UE is changed, the CSS initiates a subscription data insertion flow to synchronize the updated CSG subscription data of the UE to the mobility management network element.

404: The CSS sends a response message to the mobility management network element.

For example, the response message may be a CSG location update reply message.

After the CSS receives the CSG subscription data request sent by the mobility management network element, if the CSS has the CSG subscription data of the UE, the CSS carries the CSG subscription data of the UE in a response message sent to the mobility management network element, and stores the identifier of the mobility management network element.

If the CSS does not have the CSG subscription data of the UE, the response message sent by the CSS to the mobility management network element may carry an indication cell, for indicating that the CSG subscription data of the UE does not exist. For example, a No CSG Data cell may be carried in the response message to indicate that the CSG subscription data of the UE does not exist.

Optionally, if the CSS does not have the CSG subscription data of the UE, the CSS may store the identifier of the mobility management network element and the identifier of the UE. For example, the CSS may generate temporary context information of the UE and store the information, which includes the identifier of the mobility management network element and the identifier of the UE.

Optionally, if the CSG subscription data request sent by the mobility management network element includes a CSS registration indication, and the CSS does not have the CSG subscription data of the UE, the CSS stores the identifier of the mobility management network element and the identifier of the UE. For example, the CSS may generate temporary context information of the UE and store the information, which includes the identifier of the mobility management network element and the identifier of the UE.

In this way, by storing, in the CSS, the identifier of the mobility management network element and the identifier of the UE, when the CSG subscription data of the UE is changed, the CSS may initiate a subscription data insertion flow to synchronize the updated CSG subscription data to the mobility management network element. For the specific steps of synchronizing, by the CSS, the CSG subscription data to the mobility management network element, reference is made to steps 307-310, so the details are not described herein again.

If the CSS stores the identifier of the mobility management network element and the identifier of the UE when the CSS does not have the CSG subscription data of the UE, the CSS may carry a CSS registration success indication in a response message to indicate that the CSS has already stored the identifier of the mobility management network element.

405: The mobility management network element performs CSG access control processing.

The mobility management network element performs CSG access control processing according to the response message sent by the CSS.

For example, if the response message sent by the CSS includes the CSG subscription data of the UE, the mobility management network element may store the CSG subscription data and perform the CSG access control processing according to the CSG subscription data.

For example, if the response message sent by the CSS includes a CSS registration success indication, the mobility management network element may store the CSS registration success indication. The mobility management network element stores the CSS registration success indication, and decides whether to send the CSG subscription data request in the subsequent service, thereby effectively reducing the signaling interaction between the mobility management network element and the CSS and alleviating the load of the network.

In addition, for example, if the CSG subscription data request sent by the mobility management network element to the CSS includes a CSS registration indication, the mobility management network element may also voluntarily generate a CSS registration success indication and store it, without the need of storing the CSS registration success indication sent by the CSS. Storing, by the mobility management network element, the voluntarily generated CSS registration success indication may be performed before step 404, and may also be performed after step 404.

In the method shown in FIG. 4, when the mobility management network element does not have the closed subscriber group subscription data of the user equipment and the closed subscriber group subscriber server does not store the identifier of the mobility management network element, the mobility management network element actively sends a request for closed subscriber group subscription data to the closed subscriber group subscriber server to obtain the closed subscriber group subscription data of the user equipment, thereby solving the problem that the user equipment cannot access a closed subscriber group area, which the user equipment is allowed to access, of a visited domain network because the mobility management network element cannot acquire the updated closed subscriber group subscription data of the user equipment.

The method for requesting closed subscriber group subscription data provided by the embodiment of the present invention may also be applied in a scenario where the user equipment of a visited domain network is handed over to a CSG cell, for example, in a case that the mobility management network element of a source access network element is the same as that of a destination access network element.

401': The source access network element and the destination access network element perform handover preparation.

402': The destination access network element sends a path handover request message to the mobility management network element.

The path handover request message includes information of a destination area, such as, a tracking area identifier (Tracking Area Identifier, TAI) and cell information. Because a destination cell is a CSG cell, the path handover request message further includes indication information for indicating that the destination cell is the CSG cell, where the indication information may be a CSG ID of the destination cell.

For steps 403' to 406', reference may be made to steps 402 to 405, so the details are not described herein again.

Still for example, in a case that the mobility management network element of the source access network element is different from that of the destination access network element, the following are included.

401": The source access network element decides to hand over to the destination access network element.

402": The source access network element sends a handover requirement message to the source mobility management network element.

The handover requirement message includes information of a destination area, such as, a tracking area identifier (Tracking Area Identifier, TAI) and cell information. Because a destination cell is a CSG cell, the handover requirement message further includes indication information for indicating that the destination cell is the CSG cell, where the indication information may be a CSG ID of the destination cell.

For steps 403" to 406", reference may be made to steps 402 to 405, where the mobility management network element is replaced by a source mobility management network element herein, so the details are not described herein again.

If a response message sent by the CSS to the source mobility management network element includes the CSG subscription data of the user equipment, and the CSG subscription data indicates that the user equipment can access the CSG of the destination cell, steps 407" to 4011" can be performed.

407": The source mobility management network element sends a forward relocation request (Forward Relocation Request) message to a destination mobility management network element.

The forward relocation request may include the CSG subscription data of the user equipment.

408": The destination mobility management network element sends a handover request (Handover Request) message to the destination access network element.

409": The destination access network element sends a handover request acknowledgment (Handover Request Ack) message to the destination mobility management network element.

410": The destination mobility management network element sends a forward relocation response (Forward Relocation Response) message to the source mobility management network element.

Optionally, if the handover fails, the forward relocation response includes indication information for indicating handover reject or handover failure.

411": The source mobility management network element sends a handover command (Handover Command) message to the source access network element.

Optionally, if the indication information for indicating handover reject or handover failure is received, the source mobility management network element sends a handover reject (Handover Reject) message to the source access network element.

In a scenario where the user equipment of a visited domain network is handed over to the CSG cell, with the method for requesting closed subscriber group subscription data provided by the embodiment of the present invention, when the mobility management network element does not have the closed subscriber group subscription data of the user equipment and the closed subscriber group subscriber server does not store the identifier of the mobility management network element, the mobility management network element may actively send a request for closed subscriber group subscription data to the closed subscriber group subscriber server to obtain the closed subscriber group subscription data of the user equipment, thereby solving the problem that the user equipment cannot access a closed subscriber group area, which the user equipment is allowed to access, of a visited domain network because the mobility management network element cannot acquire the updated closed subscriber group subscription data of the user equipment.

Figure 5:
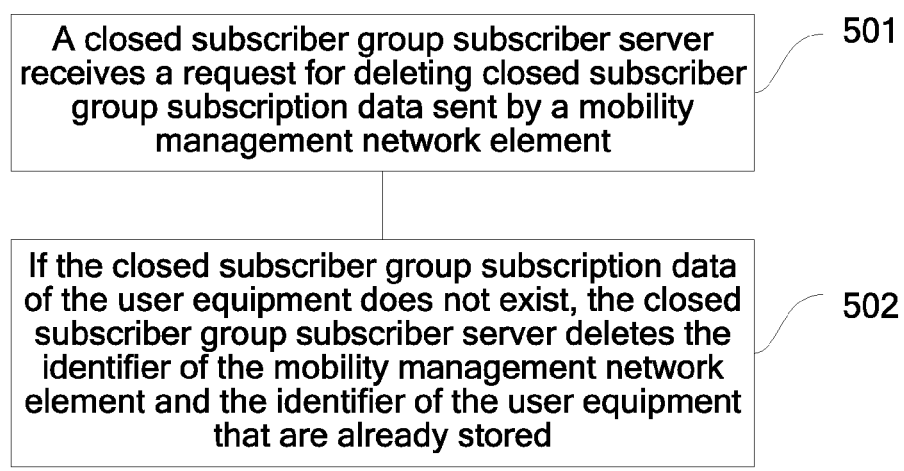
FIG. 5 is a schematic flow chart of a method for deleting closed subscriber group subscription data according to an embodiment of the present invention.

An embodiment of the present invention further provides a method for deleting closed subscriber group subscription data. As shown in FIG. 5, the method includes the following:

501: A closed subscriber group subscriber server receives a request for deleting closed subscriber group subscription data sent by a mobility management network element.

The request for deleting closed subscriber group subscription data includes an identifier of a user equipment.

502: If the closed subscriber group subscription data of the user equipment does not exist, the closed subscriber group subscriber server deletes the identifier of the mobility management network element and the identifier of the user equipment that are already stored.

For example, if the closed subscriber group subscriber server stores the identifier of the mobility management network element and the identifier of the user equipment by generating the temporary equipment context of the user equipment, the closed subscriber group subscriber server deletes the generated temporary equipment context of the user equipment.

Optionally, if the closed subscriber group subscription data of the user equipment exists, the closed subscriber group subscriber server deletes the stored identifier of the mobility management network element.

In the method shown in FIG. 5, when the previously stored identifier of the mobility management network element and the previously stored identifier of the user equipment are deleted by determining that the closed subscriber group subscription data of the user equipment does not exist, the temporarily generated data can be deleted after the user equipment is detached, thereby saving CSS resources.

Figure 6:
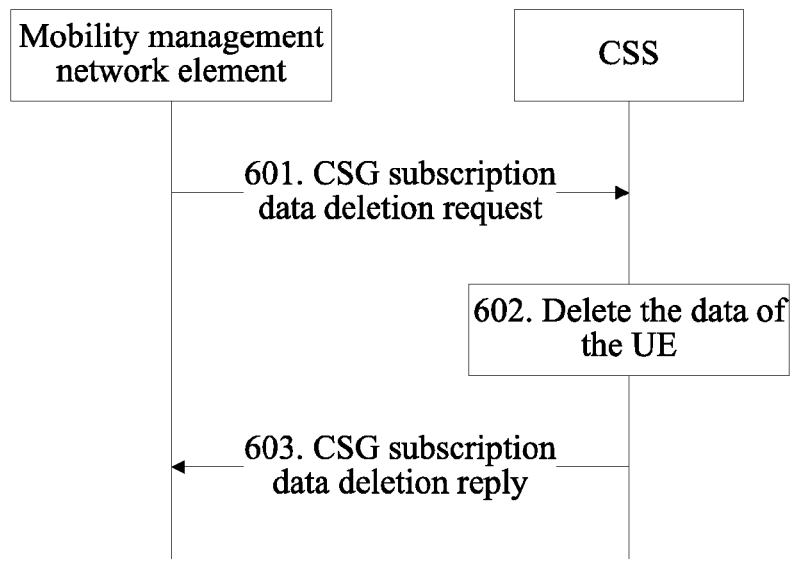
FIG. 6 is a schematic flow chart of another method for deleting closed subscriber group subscription data according to an embodiment of the present invention.

The method shown in FIG. 5 is described with reference to a specific scenario. If the UE is detached from a visited domain network, as shown in FIG. 6, the following are included.

601: The mobility management network element sends a CSG subscription data deletion request to the CSS.

The mobility management network element can send the CSG subscription data deletion request immediately after the UE is detached from the visited domain network, or send the CSG subscription data deletion request after a period of time, where the CSG subscription data request carries the identifier of the UE.

602: The CSS deletes data of the UE.

If the CSS does not have the subscription data of the UE and the CSS subsequently stores the identifier of the UE and the identifier of the mobility management network element, the identifier of the UE and the identifier of the mobility management network element need to be deleted; if other data of the UE is also stored at the same time, the data also needs to be deleted. For example, if the CSS stores the temporary context information of the UE, and the temporary context information includes the identifier of the UE and the identifier of the mobility management network element as well as other information related to the UE, during the deletion, the CSS needs to delete the whole temporary context of the UE.

If the CSS has the CSG subscription data of the UE, the CSS needs to delete an identifier of an MME to which the UE is attached, and does not delete the CSG subscription data of the UE.

603: The CSS sends a CSG subscription data deletion reply message to the mobility management network element.

The CSS sends the CSG subscription data deletion reply message to the mobility management network element, so as to indicate deletion operation success.

In the method shown in FIG. 6, when the previously stored identifier of the mobility management network element and the previously stored identifier of the user equipment are deleted by determining that the closed subscriber group subscription data of the user equipment does not exist, the temporarily generated data can be deleted after the user equipment is detached, thereby saving CSS resources.

Figure 7:
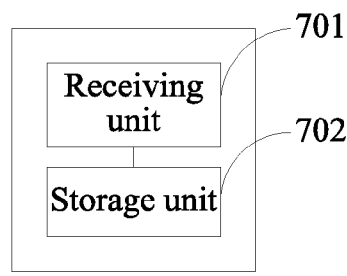
FIG. 7 is a schematic structural diagram of a closed subscriber group subscriber server according to an embodiment of the present invention.

As shown in FIG. 7, an embodiment of the present invention further provides a closed subscriber group subscriber server. The closed subscriber group subscriber servers shown in FIG. 1 and FIG. 3 may be both implemented by the closed subscriber group subscriber server shown in FIG. 7.

The closed subscriber group subscriber server shown in FIG. 7 includes a number of units. A receiving unit 701 is configured to receive a request for closed subscriber group subscription data sent by a mobility management network element. The request for closed subscriber group subscription data includes an identifier of the mobility management network element and an identifier of a user equipment, and is used for requesting closed subscriber group subscription data of the user equipment. A storage unit 702 is configured to, when the closed subscriber group subscription data of the user equipment does not exist, store the identifier of the mobility management network element and the identifier of the user equipment.

Further, the request for closed subscriber group subscription data further includes a registration indication of the closed subscriber group subscriber server, for instructing to store the identifier of the mobility management network element and the identifier of the user equipment. The storage unit 702 is specifically configured to, when the closed subscriber group subscription data of the user equipment does not exist and the request for closed subscriber group subscription data includes the registration indication of the closed subscriber group subscriber server, store the identifier of the mobility management network element and the identifier of the user equipment.

Figure 8:
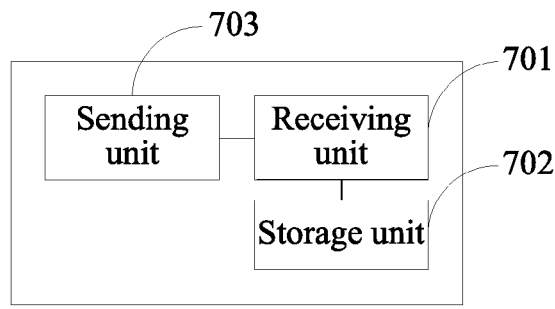
FIG. 8 is a schematic structural diagram of another closed subscriber group subscriber server according to an embodiment of the present invention.

Optionally, as shown in FIG. 8, the closed subscriber group subscriber server further includes a sending unit 703, configured to, when the closed subscriber group subscription data of the user equipment does not exist, send the registration success indication of the closed subscriber group subscriber server to the mobility management network element, where the registration success indication of the closed subscriber group subscriber server is used for indicating that the closed subscriber group subscriber server has already stored the identifier of the mobility management network element.

Optionally, the storage unit 702 is further configured to, when the closed subscriber group subscription data of the user equipment exists, store the identifier of the mobility management network element.

Optionally, the sending unit 703 is further configured to, when the closed subscriber group subscription data of the user equipment exists, send the closed subscriber group subscription data of the user equipment to the mobility management network element.

Figure 9:
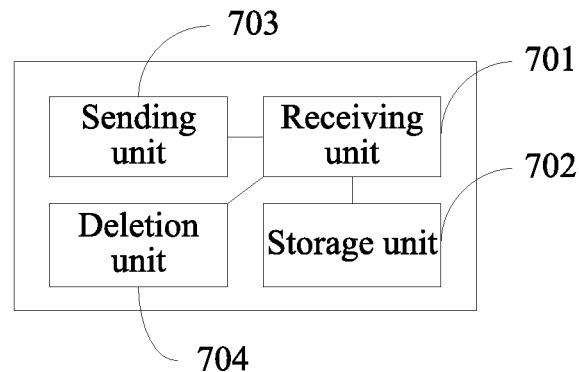
FIG. 9 is a schematic structural diagram of still another closed subscriber group subscriber server according to an embodiment of the present invention.

Optionally, as shown in FIG. 9, the receiving unit 701 is further configured to, receive a request for deleting closed subscriber group subscription data sent by the mobility management network element, where the request for deleting closed subscriber group subscription data includes the identifier of the user equipment. The closed subscriber group subscriber server further includes a deletion unit 704, which is configured to, when the closed subscriber group subscription data of the user equipment does not exist, delete the identifier of the mobility management network element and the identifier of the user equipment that are already stored. The closed subscriber group subscriber servers shown in FIG. 5 and FIG. 6 may be both implemented by a closed subscriber group subscriber server shown in FIG. 9.

Optionally, the deletion unit 704 is further configured to, when the closed subscriber group subscription data of the user equipment exists, delete the identifier of the mobility management network element to which the user equipment is attached.

In a case that the closed subscriber group subscription data of the user equipment does not exist, the closed subscriber group subscriber server shown in FIG. 7 to FIG. 9 stores the identifier of the mobility management network element, and when the closed subscriber group subscription data of the user equipment is changed, initiates, according to the stored identifier of the mobility management network element, a subscription data insertion flow to synchronize the updated closed subscriber group subscription data to the mobility management network element, thereby solving the problem that the user equipment cannot access a closed subscriber group area, which the user equipment is allowed to access, of a visited domain network because the mobility management network element cannot acquire the updated closed subscriber group subscription data of the user equipment.

Figure 10:
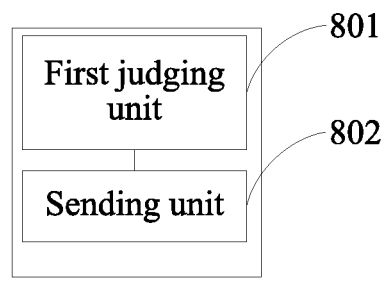
FIG. 10 is a schematic structural diagram of a mobility management network element according to an embodiment of the present invention.

As shown in FIG. 10, an embodiment of the present invention further provides a mobility management network element. The mobility management network elements shown in FIG. 2 and FIG. 4 may be both implemented by the mobility management network element shown in FIG. 10.

The mobility management network element shown in FIG. 10 includes a number of units. A first judging unit 801 is configured to, when the mobility management network element does not have the closed subscriber group subscription data of a user equipment, determine whether the mobility management network element has a registration success indication of a closed subscriber group subscriber server of the user equipment. The registration success indication of the closed subscriber group subscriber server is used for indicating that the closed subscriber group subscriber server stores an identifier of the mobility management network element.

A sending unit 802 is configured to, when the first judging unit 801 determines that the mobility management network element does not have the registration success indication of the closed subscriber group subscriber server of the user equipment, send a request for closed subscriber group subscription data to the closed subscriber group subscriber server, where the request for closed subscriber group subscription data includes the identifier of the mobility management network element and an identifier of the user equipment, and is used for requesting closed subscriber group subscription data of the user equipment.

Figure 11:
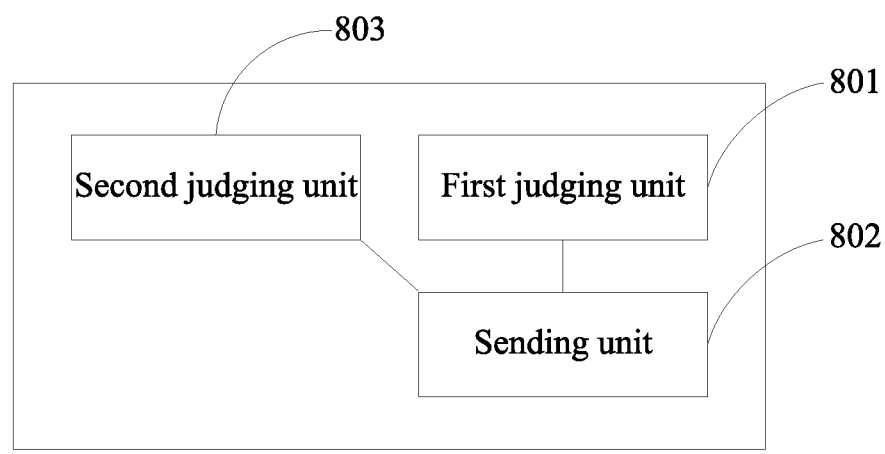
FIG. 11 is a schematic structural diagram of another mobility management network element according to an embodiment of the present invention.

Optionally, as shown in FIG. 11, the mobility management network element further includes a second judging unit 803, which is configured to determine whether a cell to which the user equipment requests access is a closed subscriber group cell. The second unit 802 is specifically configured to, when the first judging unit 801 determines that the mobility management network element does not have the registration success indication of the closed subscriber group subscriber server of the user equipment and the second judging unit 803 determines that the cell to which the user equipment requests access is a closed subscriber group cell, send a request for closed subscriber group subscription data to the closed subscriber group subscriber server, where the request for closed subscriber group subscription data includes the identifier of the mobility management network element and the identifier of the user equipment, and is used for requesting closed subscriber group subscription data of the user equipment.

Figure 12:
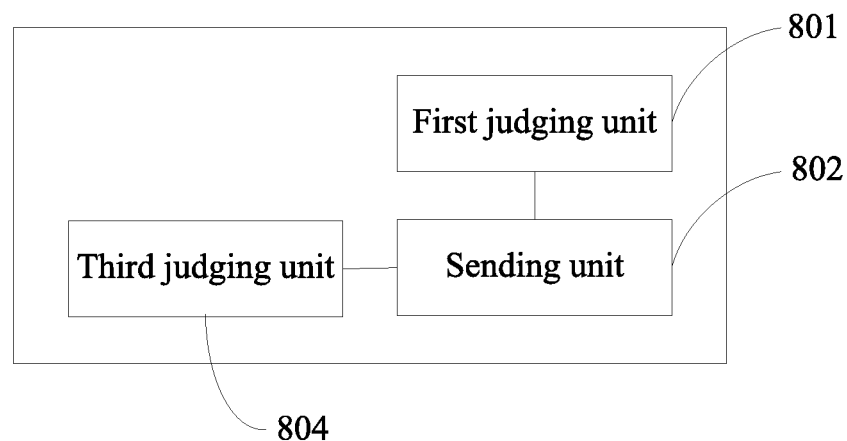
FIG. 12 is a schematic structural diagram of still another mobility management network element according to an embodiment of the present invention.

Optionally, as shown in FIG. 12, the mobility management network element further includes a third judging unit 804, which is configured to determine whether the user equipment is a user equipment subscribing to a closed subscriber group service. The sending unit 802 is specifically configured to, when the first judging unit 801 determines that the mobility management network element does not have the registration success indication of the closed subscriber group subscriber server of the user equipment and the third judging unit 804 determines that the user equipment is a user equipment subscribing to a closed subscriber group service, send a request for closed subscriber group subscription data to the closed subscriber group subscriber server, where the request for closed subscriber group subscription data includes the identifier of the mobility management network element and an identifier of the user equipment, and is used for requesting closed subscriber group subscription data of the user equipment.

Optionally, the request for closed subscriber group subscription data further includes a registration indication of the closed subscriber group subscriber server, for instructing to store the identifier of the mobility management network element and the identifier of the user equipment.

Optionally, the mobility management network element further includes a storage unit, which is configured to store the registration success indication of the closed subscriber group subscriber server.

Optionally, the mobility management network element further includes a receiving unit, which is configured to receive the registration success indication of the closed subscriber group subscriber server or the closed subscriber group subscription data of the user equipment that is sent by the closed subscriber group subscriber server.

When the mobility management network element does not have the closed subscriber group subscription data of the user equipment and the closed subscriber group subscriber server does not store the identifier of the mobility management network element, the mobility management network element shown in FIG. 10 to FIG. 12 actively sends the request for closed subscriber group subscription data to the closed subscriber group subscriber server to obtain the closed subscriber group subscription data of the user equipment, thereby solving the problem that the user equipment cannot access a closed subscriber group area, which the user equipment is allowed to access, of a visited domain network because the mobility management network element cannot acquire the updated closed subscriber group subscription data of the user equipment.

Figure 13:
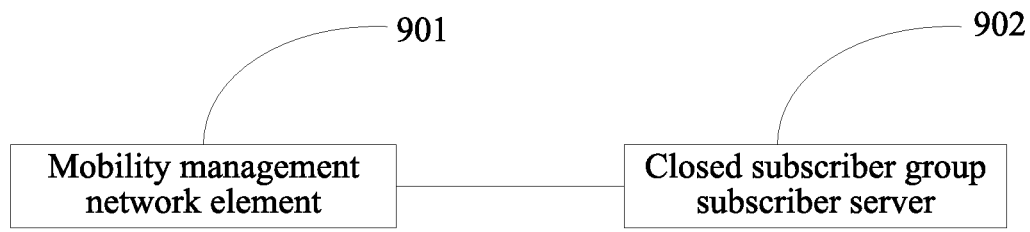
FIG. 13 is a schematic structural diagram of a system for processing a request for closed subscriber group subscription data according to an embodiment of the present invention.

An embodiment of the present invention further provides a system for processing a request for closed subscriber group subscription data, which can implement the system formed by the mobility management network element and the closed subscriber group subscriber server in FIG. 4. As shown in FIG. 13, the system includes a mobility management network element 901 and a closed subscriber group subscriber server 902.

The mobility management network element 901 is configured to, when the mobility management network element 901 does not have the closed subscriber group subscription data of a user equipment, determine that the mobility management network element 901 does not have a registration success indication of a closed subscriber group subscriber server of the user equipment; and send a request for closed subscriber group subscription data to the closed subscriber group subscriber server 902, where the request for closed subscriber group subscription data includes an identifier of the mobility management network element 901 and an identifier of the user equipment, and is used for requesting closed subscriber group subscription data of the user equipment.

The closed subscriber group subscriber server 902 is configured to receive the request for closed subscriber group subscription data sent by the mobility management network element 901, and if the closed subscriber group subscription data of the user equipment does not exist, store the identifier of the mobility management network element 901 and the identifier of the user equipment.

Optionally, the mobility management network element 901 is further configured to send a request for deleting closed subscriber group subscription data to the closed subscriber group subscriber server 902, where the request for deleting closed subscriber group subscription data includes an identifier of the user equipment. The closed subscriber group subscriber server 902 is further configured to receive the request for deleting closed subscriber group subscription data sent by the mobility management network element 901, and when the closed subscriber group subscription data of the user equipment does not exist, delete the identifier of the mobility management network element 901 and the identifier of the user equipment that are already stored.

With the system for processing a request for closed subscriber group subscription data provided by the embodiment of the present invention, in one aspect, when the closed subscriber group subscription data of the user equipment does not exist, the closed subscriber group subscriber server stores the identifier of the mobility management network element, and when the closed subscriber group subscription data of the user equipment is changed, the closed subscriber group subscriber server may initiate a subscription data insertion flow according to the stored identifier of the mobility management network element to synchronize the updated closed subscriber group subscription data to the mobility management network element. In another aspect, when the mobility management network element does not have the closed subscriber group subscription data of the user equipment and the closed subscriber group subscriber server does not store the identifier of the mobility management network element, the mobility management network element actively sends the request for closed subscriber group subscription data to the closed subscriber group subscriber server to obtain the closed subscriber group subscription data of the user equipment. Therefore, with the technical solutions provided by the embodiments of the present invention, the mobility management network element can obtain the updated closed subscriber group subscription data of the user equipment, thereby solving the problem that the user equipment cannot access a closed subscriber group area, which the user equipment is allowed to access, of a visited domain network because the mobility management network element cannot acquire the updated closed subscriber group subscription data of the user equipment.

It can be clearly understood by persons skilled in the art that, for convenience and brevity of description, for the specific working processes of the system, device, and units described above, reference may be made to the corresponding processes in the foregoing method embodiments, so the details are not described herein again.

It can be understood by persons with ordinary skill in the art that, the accompanying drawings are schematic diagrams of one embodiment, and the units or processes in the accompanying drawings are not necessarily required for implementing the present invention.

Persons skilled in the art can understood that, information and signals may be indicated by using any technology techniques (technology techniques), for example, the data (data), instructions (instructions), command (command), information (information), signal (signal), bit (bit), symbol (symbol), and chip (chip) may be indicated by using the voltage, current, electromagnetic wave, magnetic field or magnetic particles (magnetic particles), optical field or optical particles (optical particles), or any combination of the above.

Persons skilled in the art can further understood that, the various illustrative logical blocks (illustrative logical block) and the steps (step) listed in the embodiments of the present invention may be implemented through e-mail, computer software, or a combination of the two. To clearly show interchangeability (interchangeability) of hardware and software, the various illustrative components and steps have already generally described their functions. Whether the functions are implemented in a mode of hardware or software depends on specific applications and the design requirements of the whole system. For each specific application, persons skilled in the art may use different methods to implement the functions, but the implementation should not construed as departing from the protection scope of the embodiments of the present invention.

The functions of the illustrative logical blocks, units and circuits described in the embodiments of the present invention may be implemented or executed by using a general processor, a digital signal processor, an Application Specific Integrated Circuit (ASIC), a Field Programmable Gate Array (FPGA) or another programmable logic device, a discrete gate or transistor logic, discrete hardware component, or any combination of the above. The general processor may be a micro-processor, and optically, the general processor may also be any conventional processor, controller, micro-controller, or state machine. The processor may also be implemented by using a combination of computer devices, for example, may be implemented by the digital signal processor and the micro-processor, multiple micro-processors, one or more micro-processors in combination with one digital signal processor core, or any other similar configurations.

Steps of the method or algorithm described in the embodiment of the present invention may be directly implemented using hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or any storage medium of other forms well-known in the technical field. For example, the storage medium may be connected to the processor, so that the processor may read information from the storage medium, and write information into the storage medium. Optionally, the storage medium may be further integrated into the processor. The processor and the storage medium may be configured in an ASIC, and the ASIC may be configured in a user terminal. Optionally, the processor and the storage medium may also be configured in different components of the user terminal.

In one or more illustrative designs, the foregoing functions described in the embodiments of the present invention may be implemented in hardware, software, firmware or any combination thereof. If it is implemented in the software, these functions may be stored on a computer readable medium, or transmitted on the computer readable medium in a mode of one or more instructions or codes. The computer readable medium includes a computer storage medium and a communication medium enabling the computer programs to transfer from one place to another place. The storage medium may be an available media that any general or special computer can access. For example, such a computer readable medium may include, but is not limited to, a RAM, a ROM, an EEPROM, a CD-ROM, or another optical storage device, magnetic disk or another magnetic storage device, or any other medium capable of bearing or storing instructions, data structures, and other program codes capable of being read by general or special computers or general or special processors. In addition, any connection may be properly defined as the computer readable medium, for example, if software is transmitted from a website, a server, or another remote resource through a coaxial cable, a fiber computer, a twisted pair, a digital subscriber line (DSL), or a wireless manner such as infrared, wireless, and microwave, the software is also included in the defined computer readable medium. The disk (disk) or the disc (disc) includes a compressed disc, a laser disc, an optical disk, a DVD, a floppy disk, and a blue-ray disc. The disc duplicates the data with magnetism, while the disk optically duplicates the data with laser. The foregoing combination may also be included in the computer readable medium.

Through the foregoing description of the specification of the present invention, any content that can be used or implement the present invention in the prior art and any modifications based on the disclosed content shall be construed to be obviously known in the field. The basic principle described in the present invention may be applied to other variations without departing from the essence and scope of the present invention. Therefore, the content disclosed in the present invention is not merely limited to the described embodiments and designs, and may be extended to the maximum scope consistent with the principle of the present invention and the disclosed new characteristics.

What is claimed is:

1. A method for requesting closed subscriber group (CSG) subscription data, the method comprising:
   determining, by a mobility management element (MME) in response to receiving a first request from a user equipment (UE), whether the MME has previously received from a CSG subscriber server (CSS) a message comprising an indication that the CSS has already stored a first identifier of the MME, and whether the UE has subscribed to a CSG service;
   sending, by the MME, a second request to the CSS in response to determining that the MME has not previously received the indication and that the UE has subscribed to the CSG service, wherein the second request comprises the first identifier of the MME and a second identifier of the UE and is used for requesting the CSG subscription data of the UE; and
   receiving, by the MME from the CSS, the indication after the second request is received by the CSS.

2. The method according to claim 1, wherein, before sending the second request to the CSS, the method further comprises determining, by the MME, that a cell to which the UE requests access is a CSG cell.

3. The method according to claim 1, wherein the second request further comprises a registration indication of the CSS for instructing to store the first identifier and the second identifier.

4. The method according to claim 1, further comprising storing, by the MME, the indication.

5. The method according to claim 1, further comprising:
   not sending, by the MME, the second request to the CSS in response to determining that the MME has previously received the indication.

6. A mobility management element (MME), comprising:
   a receiver, configured to receive a first request from a user equipment (UE);
   a processor, configured to determine, in response to receiving the first request from the UE, whether the MME has previously received from a CSG subscriber server (CSS) a message comprising an indication that the CSS has already stored a first identifier of the MME, and whether the UE has subscribed to a CSG service;
   a transmitter, configured to send a second request to the CSS in response to determining that the MME has not previously received the indication and that the UE has subscribed to the CSG service, wherein the second request comprises the first identifier of the MME and a second identifier of the UE and is used for requesting the CSG subscription data of the UE; and
   wherein the receiver is further configured to receive, from the CSS, the message comprising the indication after the second request is received by the CSS.

7. The MME according to claim 6, wherein:
   the processor, is further configured to determine whether a cell to which the UE requests access is a CSG cell; and
   the transmitter is further configured to, in response to determining that the MME has not previously received the indication and that a cell to which the UE requests access is a CSG cell, send the second request to the CSS.

8. The MME according to claim 6, wherein the second request further comprises a registration indication of the CSS, for instructing to store the first identifier and the second identifier.

9. The MME according to claim 6, further comprising a memory, configured to store the indication.

10. The MME according to claim 6, wherein the transmitter is further configured to not send the second request to the CSS in response to determining that the MME has previously received the indication.

11. A non-transitory computer readable medium, comprising:
   a computer program code comprising one or more executable instructions, which, when executed by a mobility management element (MME), cause the MME to perform a method for requesting closed subscriber group (CSG) subscription data, wherein the method comprises:
   determining, in response to receiving a first request from a user equipment (UE), whether the MME has previously received from a CSG subscriber server (CSS) a message comprising an indication that the CSS has already stored a first identifier of the MME, and whether the UE has subscribed to a CSG service;

sending a second request to the CSS in response to determining that the MME has not previously received the indication and that the UE has subscribed to the CSG service, wherein the second request comprises the first identifier of the MME and a second identifier of the UE and is used for requesting the CSG subscription data of the UE; and receiving, from the CSS, the indication after the second request is received by the CSS.

12. The non-transitory computer readable medium according to claim 11, wherein the executable instructions, when executed by the MME before the MME sends the second request to the CSS, cause the MME to further determine that a cell to which the UE requests access is a CSG cell.

13. The non-transitory computer readable medium according to claim 11, wherein the second request further comprises a registration indication of the CSS for instructing to store the first identifier and the second identifier.

14. The non-transitory computer readable medium according to claim 11, wherein the executable instructions, when executed by the MME, cause the MME to further store the indication.

15. The non-transitory computer readable medium according to claim 11, wherein the executable instructions, when executed by the MME, cause the MME to not send the second request to the CSS in response to determining that the MME has previously received the indication.

* * * * *